(12) United States Patent
O'Phelan

(10) Patent No.: US 7,154,739 B2
(45) Date of Patent: *Dec. 26, 2006

(54) FLAT CAPACITOR HAVING AN ACTIVE CASE

(75) Inventor: Michael J. O'Phelan, Oakdale, MN (US)

(73) Assignee: Cardiac Pacemakers, Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/969,441

(22) Filed: Oct. 20, 2004

(65) Prior Publication Data

US 2005/0052825 A1 Mar. 10, 2005

Related U.S. Application Data

(62) Division of application No. 09/706,517, filed on Nov. 3, 2000, now Pat. No. 6,833,987.

(51) Int. Cl.
*H01G 9/04* (2006.01)

(52) U.S. Cl. ............... 361/508; 361/509; 361/516; 361/523; 361/525; 361/528; 29/25.03

(58) Field of Classification Search ............ 361/508, 361/509, 512, 516, 519, 520, 525, 523, 528–530; 29/25.03; 607/5, 9, 17
See application file for complete search history.

(56) References Cited

U.S. PATENT DOCUMENTS

| | | | |
|---|---|---|---|
| 1,931,043 A | 10/1933 | Taylor | 361/301.3 |
| 2,555,326 A | 6/1951 | Doughty Jr. | |
| 3,182,238 A | 5/1965 | Toder et al. | 317/260 |
| 3,389,311 A | 6/1968 | Rayno | |
| 3,424,857 A | 1/1969 | Miller et al. | |
| 3,643,168 A | 2/1972 | Manicki | 325/459 |
| 3,686,535 A | 8/1972 | Piper | |
| 3,686,538 A | 8/1972 | Webster | |
| 3,723,926 A | 3/1973 | Thomas et al. | 335/268 |
| 3,742,938 A | 7/1973 | Stern | 128/2.05 T |
| 3,777,570 A | 12/1973 | Thomas et al. | 73/398 |
| 3,803,457 A | 4/1974 | Yamamoto | 317/230 |
| 3,826,143 A | 7/1974 | Thomas et al. | 73/398 C |
| 3,828,227 A | 8/1974 | Millard et al. | 317/230 |
| 3,859,574 A | 1/1975 | Brazier | 317/230 |
| 3,914,666 A | 10/1975 | Schmickl et al. | 317/261 |
| 3,938,228 A | 2/1976 | Kemkers et al. | 29/25.42 |
| 3,993,508 A | 11/1976 | Erlichman | 29/623.2 |
| 4,047,790 A | 9/1977 | Carino | 439/720 |

(Continued)

FOREIGN PATENT DOCUMENTS

EP 0224733 A1 6/1987

(Continued)

OTHER PUBLICATIONS

Moynihan, J. D., "Theory, Design and Application of Electrolytic Capacitors", Copyright by John D. Moynihan,(1982), 136 p.

(Continued)

*Primary Examiner*—Nguyen T. Ha
(74) *Attorney, Agent, or Firm*—Schwegman, Lundberg, Woessner, & Kluth, P.A.

(57) ABSTRACT

A capacitor comprising an aluminum case; a capacitor stack mounted within the aluminum case, the capacitor stack comprising one or more anodes and one or more cathodes, one of the one or more anodes and one or more anodes attached to the aluminum case; wherein the case is adapted to be an active capacitor element.

17 Claims, 11 Drawing Sheets

U.S. PATENT DOCUMENTS

| | | | |
|---|---|---|---|
| 4,086,148 A | 4/1978 | Badia | 204/33 |
| 4,088,108 A | 5/1978 | Hager | 123/148 CC |
| 4,131,935 A | 12/1978 | Clement | 361/433 |
| 4,169,003 A | 9/1979 | Dangel et al. | 156/179 |
| 4,171,477 A | 10/1979 | Funari | 219/56.21 |
| 4,232,099 A | 11/1980 | Sullivan | 429/152 |
| 4,267,565 A | 5/1981 | Puppolo et al. | |
| 4,307,142 A | 12/1981 | Blitstein et al. | |
| 4,394,713 A | 7/1983 | Yoshida | 361/502 |
| 4,425,412 A | 1/1984 | Dittmann et al. | 429/53 |
| 4,481,083 A | 11/1984 | Ball et al. | 204/38 A |
| 4,539,999 A | 9/1985 | Mans | 128/696 |
| 4,553,304 A | 11/1985 | Fleuret | 29/25.42 |
| 4,571,662 A | 2/1986 | Conquest et al. | 361/306 |
| 4,604,260 A | 8/1986 | Shimizu et al. | 419/2 |
| 4,614,194 A | 9/1986 | Jones et al. | 128/419 |
| 4,616,655 A | 10/1986 | Weinberg et al. | 128/419 |
| 4,659,636 A | 4/1987 | Suzuki et al. | 429/54 |
| 4,664,116 A | 5/1987 | Shaya et al. | 128/419 |
| 4,683,516 A | 7/1987 | Miller | 361/502 |
| 4,745,039 A | 5/1988 | Yoshinaka | 429/54 |
| 4,763,229 A | 8/1988 | Ohtuka et al. | 361/433 |
| 4,782,340 A | 11/1988 | Czubatyj et al. | 340/825.83 |
| 4,796,638 A | 1/1989 | Sasaki | 128/696 |
| 4,833,719 A | 5/1989 | Carme et al. | 381/72 |
| 4,843,518 A | 6/1989 | Okumura | 361/330 |
| 4,931,899 A | 6/1990 | Pruett | |
| 4,970,626 A | 11/1990 | Kakinoki et al. | 361/512 |
| 5,131,388 A | 7/1992 | Pless et al. | 128/419 D |
| 5,142,439 A | 8/1992 | Huggett et al. | 361/321 |
| 5,173,375 A | 12/1992 | Cretzmeyer et al. | 429/72 |
| 5,175,067 A | 12/1992 | Taylor et al. | 429/181 |
| 5,195,019 A | 3/1993 | Hertz | 694/328 |
| 5,279,029 A | 1/1994 | Burns | 29/856 |
| 5,306,581 A | 4/1994 | Taylor et al. | 429/181 |
| 5,333,095 A | 7/1994 | Stevenson et al. | |
| 5,367,437 A | 11/1994 | Anderson | 361/807 |
| 5,369,547 A | 11/1994 | Evans | 361/516 |
| 5,377,073 A | 12/1994 | Fukaumi et al. | |
| 5,414,588 A | 5/1995 | Barbee, Jr. et al. | 361/304 |
| 5,422,200 A | 6/1995 | Hope et al. | 429/157 |
| 5,428,499 A | 6/1995 | Szerlip et al. | 361/328 |
| 5,439,760 A | 8/1995 | Howard et al. | 429/94 |
| 5,448,997 A | 9/1995 | Kruse et al. | 128/697 |
| 5,469,325 A | 11/1995 | Evans | 361/526 |
| 5,471,087 A | 11/1995 | Buerger, Jr. | 257/532 |
| 5,493,259 A | 2/1996 | Blalock et al. | 333/182 |
| 5,493,471 A | 2/1996 | Walther et al. | 361/328 |
| 5,507,966 A | 4/1996 | Liu | 252/62.2 |
| 5,522,851 A | 6/1996 | Fayram | 607/5 |
| 5,527,346 A | 6/1996 | Kroll | 607/5 |
| 5,554,178 A | 9/1996 | Dahl et al. | 607/122 |
| 5,559,667 A | 9/1996 | Evans | 361/526 |
| 5,584,890 A | 12/1996 | MacFarlane et al. | 29/25.03 |
| 5,628,801 A | 5/1997 | MacFarlane et al. | 29/25.03 |
| 5,640,756 A | 6/1997 | Brown et al. | 29/701 |
| 5,645,586 A | 7/1997 | Meltzer | 623/11 |
| 5,658,319 A | 8/1997 | Kroll | 607/7 |
| 5,660,737 A | 8/1997 | Elias et al. | 216/6 |
| 5,691,079 A | 11/1997 | Daugaard | 429/152 |
| 5,716,729 A | 2/1998 | Sunderland et al. | 429/66 |
| 5,737,181 A | 4/1998 | Evans | 361/504 |
| 5,738,104 A | 4/1998 | Lo et al. | 128/706 |
| 5,754,394 A | 5/1998 | Evans et al. | 361/516 |
| 5,759,394 A | 6/1998 | Rohrbach et al. | 210/264 |
| 5,774,261 A | 6/1998 | Omori et al. | 359/464 |
| 5,776,632 A | 7/1998 | Honegger | 429/185 |
| 5,779,699 A | 7/1998 | Lipson | 606/41 |
| 5,779,891 A | 7/1998 | Andelman | 210/198.2 |
| 5,790,368 A | 8/1998 | Naito et al. | 361/523 |
| 5,800,724 A | 9/1998 | Habeger et al. | 216/35 |
| 5,801,917 A | 9/1998 | Elias | 361/535 |
| 5,811,206 A | 9/1998 | Sunderland et al. | 429/181 |
| 5,814,082 A | 9/1998 | Fayram et al. | 607/5 |
| 5,855,995 A | 1/1999 | Haq et al. | 428/210 |
| 5,867,363 A | 2/1999 | Tsai et al. | 361/502 |
| 5,882,362 A | 3/1999 | Muffoletto et al. | 29/623.1 |
| 5,901,867 A | 5/1999 | Mattson | 215/261 |
| 5,908,151 A | 6/1999 | Elias | 228/110.1 |
| 5,922,215 A | 7/1999 | Pless et al. | 216/6 |
| 5,926,357 A | 7/1999 | Elias et al. | 361/302 |
| 5,926,362 A | 7/1999 | Muffoletto et al. | |
| 5,930,109 A | 7/1999 | Fishler | 361/508 |
| 5,963,418 A | 10/1999 | Greenwood, Jr. et al. | 361/508 |
| 5,968,210 A | 10/1999 | Strange et al. | 29/25.03 |
| 5,973,906 A | 10/1999 | Stevenson et al. | 361/302 |
| 5,982,609 A | 11/1999 | Evans | 361/516 |
| 5,983,472 A | 11/1999 | Fayram et al. | 29/25.42 |
| 6,002,969 A | 12/1999 | Machek et al. | 607/122 |
| 6,004,692 A | 12/1999 | Muffoletto et al. | 429/163 |
| 6,006,133 A | 12/1999 | Lessar et al. | 607/5 |
| 6,009,348 A | 12/1999 | Rorvick et al. | 607/5 |
| 6,030,480 A | 2/2000 | Face, Jr. et al. | 156/160 |
| 6,032,075 A | 2/2000 | Pignato et al. | 607/5 |
| 6,040,082 A | 3/2000 | Haas et al. | 429/163 |
| 6,042,624 A | 3/2000 | Breyen et al. | 29/25.03 |
| 6,052,625 A | 4/2000 | Marshall | 607/122 |
| 6,094,339 A | 7/2000 | Evans | 361/516 |
| 6,094,788 A | 8/2000 | Farahmandi et al. | 25/24.41 |
| 6,099,600 A | 8/2000 | Yan et al. | 29/25.03 |
| 6,104,961 A | 8/2000 | Conger et al. | 607/122 |
| 6,110,233 A | 8/2000 | O'Phalen et al. | 29/25.03 |
| 6,110,321 A | 8/2000 | Day et al. | 156/286 |
| 6,117,194 A | 9/2000 | Strange et al. | 29/25.03 |
| 6,118,651 A | 9/2000 | Mehrotra et al. | 361/509 |
| 6,118,652 A | 9/2000 | Casby et al. | 361/517 |
| 6,139,986 A | 10/2000 | Kurokawa et al. | 429/61 |
| 6,141,205 A | 10/2000 | Nutzman et al. | 361/509 |
| 6,157,531 A | 12/2000 | Breyen et al. | 361/519 |
| 6,162,264 A | 12/2000 | Miyazaki et al. | 29/623.5 |
| 6,184,160 B1 | 2/2001 | Yan et al. | 438/800 |
| 6,191,931 B1 | 2/2001 | Paspa et al. | 361/302 |
| 6,212,063 B1 | 4/2001 | Johnson et al. | 361/517 |
| 6,225,778 B1 | 5/2001 | Hayama et al. | 320/112 |
| 6,249,423 B1 | 6/2001 | O'Phelen et al. | 361/502 |
| 6,249,709 B1 | 6/2001 | Conger et al. | 607/122 |
| 6,256,542 B1 | 7/2001 | Marshall et al. | 607/126 |
| 6,259,954 B1 | 7/2001 | Conger et al. | 607/122 |
| 6,275,371 B1 | 8/2001 | Yoshio et al. | 361/502 |
| 6,275,729 B1 | 8/2001 | O'Phelen et al. | 607/5 |
| 6,297,943 B1 | 10/2001 | Carson | 361/500 |
| 6,299,752 B1 | 10/2001 | Strange et al. | 205/152 |
| 6,321,114 B1 | 11/2001 | Nutzman et al. | 607/5 |
| 6,324,049 B1 | 11/2001 | Inagawa et al. | 361/502 |
| 6,326,587 B1 | 12/2001 | Cardineau et al. | 219/121.68 |
| 6,375,688 B1 | 4/2002 | Akami et al. | 29/25.03 |
| 6,388,284 B1 | 5/2002 | Rhodes et al. | 257/309 |
| 6,388,866 B1 | 5/2002 | Rorvick et al. | 361/503 |
| 6,402,793 B1 * | 6/2002 | Miltich et al. | 29/25.03 |
| 6,404,619 B1 | 6/2002 | Marshall et al. | 361/526 |
| 6,409,776 B1 | 6/2002 | Yan et al. | 29/25.03 |
| 6,413,283 B1 | 7/2002 | Day et al. | 29/25.3 |
| 6,442,015 B1 | 8/2002 | Niiori et al. | 361/502 |
| 6,451,073 B1 | 9/2002 | Farahmandi et al. | 29/25.03 |
| 6,477,037 B1 | 11/2002 | Nielsen et al. | 361/520 |
| 6,477,404 B1 | 11/2002 | Yonce et al. | 600/510 |
| 6,493,212 B1 | 12/2002 | Clarke et al. | 361/521 |
| 6,509,588 B1 | 1/2003 | O'Phelen et al. | 257/209 |
| 6,522,525 B1 | 2/2003 | O'Phelan et al. | 361/509 |
| 6,556,863 B1 * | 4/2003 | O'Phelan et al. | 607/5 |
| 6,571,126 B1 | 5/2003 | O'Phelan et al. | 607/5 |
| 6,585,152 B1 | 7/2003 | Farahmandi et al. | |
| 6,628,505 B1 | 9/2003 | Andelman | 361/541 |
| 6,674,634 B1 | 1/2004 | O'Phelan et al. | 361/509 |

| | | | |
|---|---|---|---|
| 6,684,102 B1 | 1/2004 | O'Phalen et al. | 607/5 |
| 6,687,118 B1 | 2/2004 | O'Phelan et al. | 361/508 |
| 6,699,265 B1 | 3/2004 | O'Phelan et al. | 607/1 |
| 6,709,946 B1 | 3/2004 | O'Phelan et al. | 438/396 |
| 6,763,265 B1 | 7/2004 | O'Phelan et al. | 607/5 |
| 6,833,987 B1 * | 12/2004 | O'Phelan | 361/508 |
| 6,957,103 B1 | 10/2005 | Schmidt et al. | |
| 6,985,351 B1 | 1/2006 | O'Phelan et al. | |
| 6,999,304 B1 | 2/2006 | Schmidt et al. | |
| 2001/0020319 A1 | 9/2001 | Farahmandi et al. | 29/25.03 |
| 2003/0077509 A1 | 4/2003 | Probst et al. | 426/162 |
| 2003/0195568 A1 | 10/2003 | O'Phelan et al. | 607/5 |
| 2004/0019268 A1 | 1/2004 | Schmidt et al. | 600/407 |
| 2004/0114311 A1 | 6/2004 | O'Phelan et al. | 361/530 |
| 2004/0127952 A1 | 7/2004 | O'Phelan et al. | 607/36 |
| 2004/0173835 A1 | 9/2004 | Schmidt et al. | 257/301 |
| 2006/0009808 A1 | 1/2006 | Schmidt et al. | |

FOREIGN PATENT DOCUMENTS

| | | |
|---|---|---|
| GB | 825900 | 12/1959 |
| GB | 2132019 | 6/1984 |
| JP | 52-004051 | 1/1977 |
| JP | 59-083772 | 5/1984 |
| JP | 05-074664 | 3/1993 |
| WO | WO-98/27562 | 6/1998 |
| WO | WO-99/51302 | 10/1999 |
| WO | WO-9951302 A1 | 10/1999 |
| WO | WO-00/19470 | 4/2000 |
| WO | WO-0237515 A2 | 5/2002 |
| WO | WO-2006002148 A1 | 1/2006 |

OTHER PUBLICATIONS

O'Phelan, Michael J., et al., "Batteries Including a Flat Plate Design", U.S. Appl. No. 10/360,551, Filed Feb. 7, 2003, 121 pgs.

O'Phelan, Michael, et al., "Capacitor Having a Feedthrough Assembly With a Coupling Member", U.S. Appl. No. 10/846,805, Filed May 14, 2004, 39 pgs.

O'Phelan, Michael J., et al., "Capacitor Having a Feedthrough Assembly With a Coupling Member", U.S. Appl. No. 09/706,579, Filed Nov. 3, 2000, 29 pgs.

O'Phelan, Michael J., et al., "Flat Capacitor for an Implantable Medical Device", U.S. Appl. No. 10/758,701, Filed Jan. 15, 2004, 219 pgs.

O'Phelan, Michael J., et al., "Flat Capacitor for an Implantable Medical Device", U.S. Appl. No. 10/758,677, Filed Jan. 15, 2004, 219 pgs.

O'Phelan, Michael J., "Flat Capacitor Having An Active Case", U.S. Appl. No. 09/706,517, Filed Nov. 3, 2000, 39 pgs.

O'Phelan, Michael J., et al., "Flat Capacitor Having Staked Foils And Edge-Connected Connection Members", U.S. Appl. No. 10/728,655, Filed Dec. 5, 2003, 65 pgs.

O'Phelan, Michael J., et al., "Implantable Heart Monitors Having Capacitors With Endcap Headers", U.S. Appl. No. 10/736,209, Filed Dec. 15, 2003, 19 pgs.

O'Phelan, Michael J., et al., "Implantable Heart Monitors Having Flat Capacitors With Curved Profiles", U.S. Appl. No. 10/729,424, Filed Dec. 4, 2003, 28 pgs.

O'Phelan, Michael, et al., "Method for Interconnecting Anodes and Cathodes in a Flat Capacitor", U.S. Appl. No. 10/874,798, filed Jun. 23, 2004, 39 pgs.

O'Phelan, Michael, et al., "Method of Constructing a Capacitor Stack for a Flat Capacitor", U.S. Appl. No. 10/882,144, Filed Jun. 30, 2004, 57 pgs.

Schmidt, Brian L., et al., "Configurations and Methods for Making Capacitor Connections", U.S. Appl. No. 09/706,576, Filed Nov. 3, 2000, 26 pgs.

Shams, A. M., et al., "Titanium hydride formation from Arabian Gulf water", *Desalination*, vol. 107, (1996), 265-276.

Schmidt, Brian, et al., "Method For Interconnecting Anodes And Cathodes In A Flat Capacitor", U.S. Appl. No. 11/325,931, Filed Jan. 5, 2006, 28 pages.

* cited by examiner

FLAT CAPACITOR HAVING AN ACTIVE CASE

CROSS-REFERENCE TO RELATED APPLICATIONS

This application is a division of U.S. patent application Ser. No. 09/706,517 filed on Nov. 3, 2000 now U.S. Pat. No. 6,833,987, the specification of which is incorporated herein by reference.

This application is related to application Ser. No. 09/706,447, filed on Nov. 3, 2000, now issued as U.S. Pat. No. 6,699,265, which is incorporated herein by reference in its entirety.

TECHNICAL FIELD

The present invention concerns implantable medical devices, such as defibrillators and cardioverters, and more specifically to a method of manufacturing a capacitor for an implantable heart monitor.

BACKGROUND

Since the early 1980s, thousands of patients prone to irregular and sometimes life-threatening heart rhythms have had miniature heart monitors, particularly defibrillators and cardioverters, implanted in their bodies, typically in the upper chest area above their hearts. These devices detect onset of abnormal heart rhythms and automatically apply corrective electrical therapy, specifically one or more bursts of electric current to the heart. When the bursts of electric current are properly sized and timed, they restore normal heart function without human intervention, sparing patients considerable discomfort and often saving their lives.

The typical defibrillator or cardioverter includes a set of electrical leads, which extend from a sealed housing into the wall of a heart after implantation. Within the housing are a battery for supplying power, monitoring circuitry for detecting abnormal heart rhythms, and a capacitor for delivering bursts of electric current through the leads to the heart.

The capacitor can take the form of a flat aluminum electrolytic capacitor. Flat capacitors include a stack of flat capacitor elements mounted within a capacitor case. Each flat capacitor element includes one or more separators between two sheets of aluminum foil. One of the aluminum foils serves as a cathode (negative) foil, and the other serves as an anode (positive) foil. Sometimes, two or more foils are stacked one on the other to form a multi-anode stack. The capacitor elements each have an individual capacitance (or energy-storage capacity) proportional to the surface area of the aluminum foil.

One drawback with these capacitors is that they consume significant space within the implantable defibrillators and cardioverters and thus limit how small these devices can be made. However, the size of the capacitor cannot be arbitrarily reduced without reducing the capacitance of the device. Accordingly, there is a need to reduce the size of the capacitor while also maintaining or increasing its capacitance. Further, there is a need to provide a compact capacitor capable of providing the required pulse of energy for use within the device and to provide for a design efficiently utilizing space within the capacitor case.

SUMMARY

In one aspect, the present invention provides a capacitor having an active case. In one embodiment, the active case comprises a cathodic case. In another embodiment, the active case comprises an anodic case.

One aspect provides a capacitor having an active cathodic case which services an adjacent anode. In one embodiment, a capacitor includes a case having an etched inner surface, the inner surface including an etched upper inner surface and an etched lower inner surface. The capacitor further includes a capacitor stack disposed within the case, where the capacitor stack includes a plurality of cathode stacks and a plurality of anode stacks, and the cathode stacks are electrically coupled with the etched inner surface. The plurality of anode stacks include a first anode stack disposed adjacent to the upper inner surface, where the first anode stack includes at least one conductive layer having a major surface. The major surface confronts the upper inner surface of the case. The capacitor further includes electrolyte disposed between the upper inner surface and the major surface to facilitate charge storage between the inner surface and the major surface.

In one embodiment, a method includes forming and aligning a capacitor stack including at least one anode stack and at least one cathode stack, etching at least a portion of an inner surface of a capacitor case, the inner surface including an upper inner surface and a lower inner surface. The method further includes disposing the capacitor stack in the capacitor case, and at least one anode stack is adjacent the inner surface of the capacitor case. The method also includes disposing an electrolyte between the at least one anode and the inner surface of the case.

One aspect provides a capacitor having an active anodic case. In one embodiment a capacitor assembly includes at least one anode stack having one or more anode conductive layers and an anode separator, and at least one cathode stack having one or more cathode conductive layers and a cathode separator. The capacitor assembly further includes at least one separator disposed between the anode stack and the cathode stack, where each at least one anode stack stacked with the cathode stack to form a capacitor stack, and a capacitor case sized to receive therein the capacitor stack. The capacitor case includes a conductive surface therein, and one or more of the anode conductive layers is electrically coupled with the conductive surface of the capacitor case.

In one embodiment, the capacitor case comprises an etched capacitor case. In another embodiment, the assembly includes a cathode feedthrough coupled with at least one cathode stack, where the cathode feedthrough extends through and is insulated from an opening of the case. In yet another embodiment, one or more of the anode conductor layers includes an exposed edge coupled with the capacitor case. In one embodiment, each of the cathode conductive layers is defined in part by a cathode edge surface, and each of the anode conductive layers is defined in part by an anode edge surface, where the cathode edge surface is offset from the anode edge surface. The assembly optionally further includes a welded connection disposed between at least one of the one or more anode conductive layers and an inner surface of the case. The assembly optionally further includes a conductive epoxied connection disposed between at least one of the one or more anode conductive layers and an inner surface of the case.

Among other advantages, in one or more embodiments, an active anodic case contributes to the effective anodic surface area which increases the capacitance of the capacitor without increasing the outer packaging dimensions. Alternatively, it allows for achievement of a given total capacitance with a smaller package. An active cathodic case provides that an outer cathode layer is not needed on the capacitor stack to service the anodes. This decreases the size of the capacitor. A further benefit is that since the edge of the cathode stack is offset from the anode stack, damage or puncturing of the separator layer is minimized.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims and their equivalents.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

Figure 1:
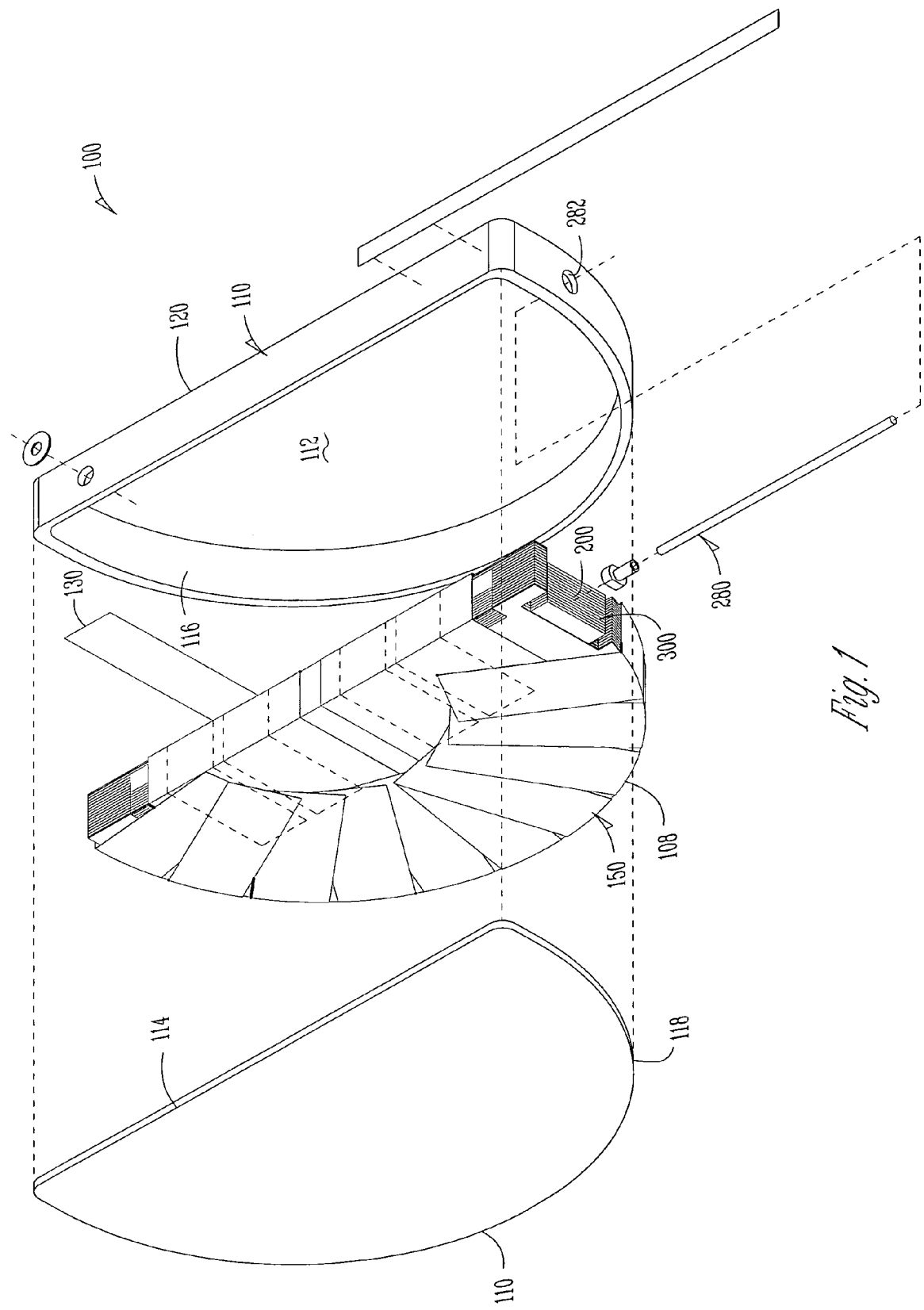
FIG. 1 is an exploded perspective view illustrating a capacitor as constructed in accordance with one embodiment.

FIG. 1 illustrates a flat capacitor 100 in accordance with one embodiment of the present invention. Capacitor 100 includes a case 110, which contains therein a capacitor assembly 108, which includes a capacitor stack 150. Case 110 is an active case. "Active case" means herein that case 110 is, in various embodiments, anodic or cathodic. In one option, the case 110 is manufactured from a conductive material, such as aluminum.

In one embodiment, the case 110 is generally D-shaped, and is sized to receive the capacitor stack 150 therein. In other embodiments, the capacitor 100 can take on other shapes and configurations, including, but not limited to, rectangular, circular, irregular, oval, or other symmetrical or asymmetrical shapes.

The capacitor stack 150 includes anode stacks 200 and cathode stacks 300, with separator layers interposed therebetween, as is further discussed below. The capacitor stack 150 further includes a connector 130 which connects, in one embodiments, the cathode stacks 300 with active case 110. In another embodiment, connector connects anodes 200 to the active case 110.

The case 110 further includes two components, a cover 118 and a bottom 120, which are coupled together as part of the assembly process. In one option, the cover 118 and the bottom 120 are welded together.

By providing an active case, wherein the case acts as an anodic element or a cathodic element, the capacitor 100 can be made smaller while delivering the same amount of energy.

Active Cathodic Case Embodiment

In one embodiment, the present invention provides a capacitor having an active cathodic case which services adjacent anodes. As used herein, "service" means that the case is cathodic in the sense that it not only is connected to the cathode stacks but literally services the anodes which are adjacent to the case. This means the case itself replaces one or two of the end cathodes which are usually present on the two outermost elements of the capacitor stack.

In this embodiment, case 110 is comprised of at least 98% aluminum. Case 110 has an inner surface 112 which includes an upper inner surface 114 and a lower inner surface 116. At least a portion of the inner surface 112 is etched, and in one option, the entire inner surface 112 is etched. In one example, the inner surface 112 of the case 10 is etched in the same way that a cathode conductive layer 320 (FIG. 5) is etched.

Figure 2:
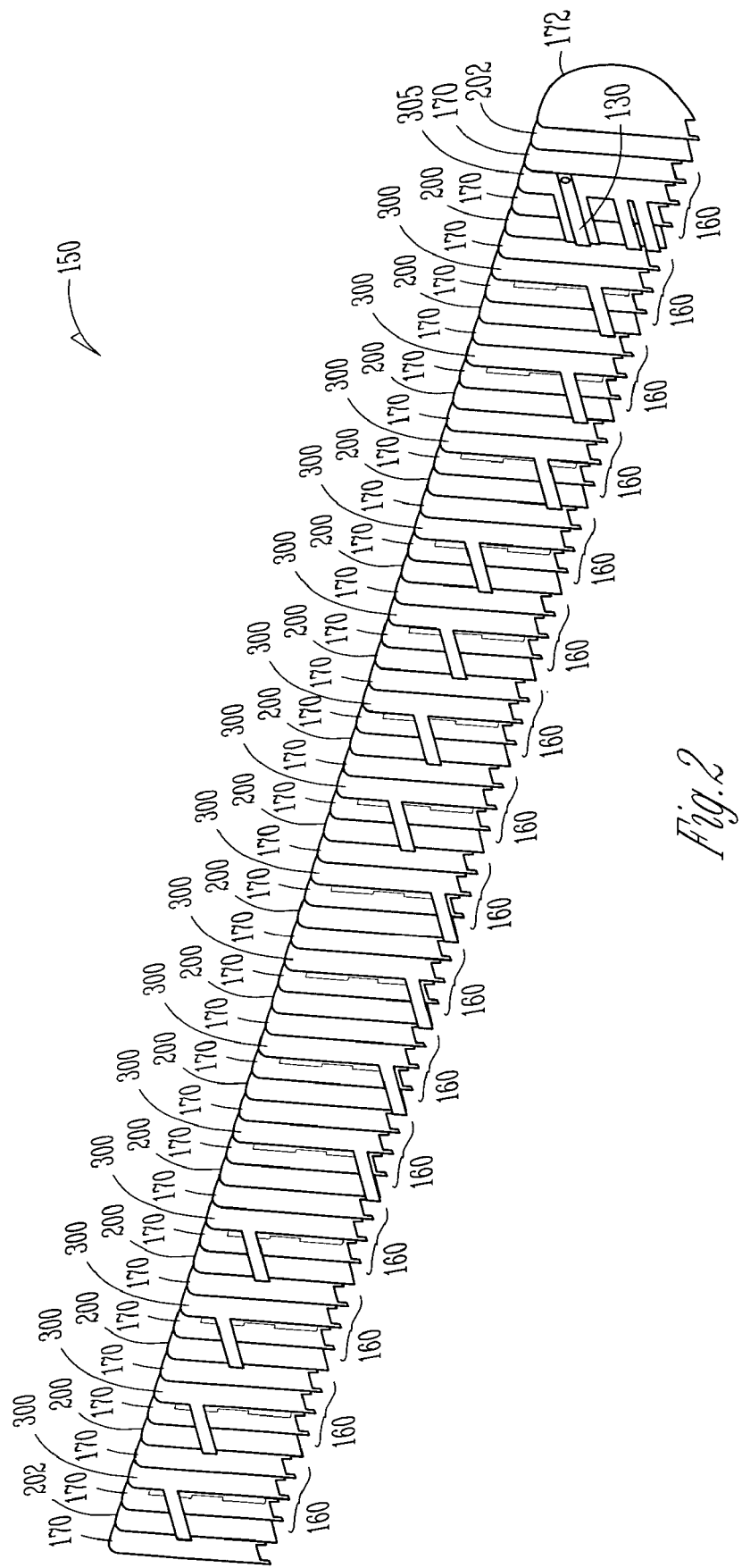
FIG. 2 is an exploded perspective view illustrating a capacitor stack as constructed in accordance with one embodiment.

FIG. 2 illustrates one example of the capacitor stack 150 in greater detail. The capacitor stack 150 includes a plurality of capacitor elements 160, each capacitor element 160 includes at least one anode stack 200, at least one separator 170, and one or more cathode stacks 300. In this embodiment, one of the cathode stacks is a cathode base layer 305.

Capacitor stack 150 also includes an end anode stack 202 and an end separator 172 which confront an inner surface 112 of case 110 (FIG. 1) when stack 150 is mounted within case 110.

Each cathode stack 300 is interconnected with the other cathode stacks in the capacitor stack 150 and with base cathode layer 305. The interconnected cathode stacks are electrically coupled with the case 110 through connection member 120 of base cathode layer 305. In this embodiment, case 110 is an active part of the cathode, as will be discussed further below. In one embodiment, a cathode stack is used as described in application Ser. No. 09/706,477, filed on Nov. 3, 2000, now issued as U.S. Pat. No. 6,669,265, and incorporated herein by reference in its entirety. Other embodiments include aluminum tabs attached to each cathode layer. The tabs are connected together and connected to case 110.

Separator 170 and 172 include, but are not limited to, two sheets of paper separator. The separators are, in one option, made from a roll or sheet of separator material. Suitable materials for the separator material include, but are not limited to, pure cellulose or Kraft paper. Other chemically inert materials are suitable as well, such as porous polymeric materials. The separator layers are cut slightly larger than the anode layers (or cathode layers) to accommodate misalignment during the stacking of layers and to prevent subsequent shorting between electrodes of opposite polarity.

The interconnected cathode stack is electrically coupled with the case 110 (FIG. 1) which has an etched inner surface 112 (FIG. 1). Capacitor stack 150 includes an end anode stack 202. Having an end anode stack 202 which is serviced by the case 110 eliminates the need for outer cathode stacks. Since at least one cathode stack 300 can be removed, this results in a space savings of at least 0.0012 inches (an exemplary cathode thickness). Further, at least one less separator 170 is needed, resulting in savings of 0.0005 inches per side. In one embodiment, a second cathode stack is removed from the other end of the capacitor stack, resulting in an additional space savings of 0.0012 inches for the foil and 0.0005 for the separator. Thus, an exemplary space saving is 0.0017 inches per side and 0.0034 inches for the both sides. These space saving are variable in various embodiments depending on the thickness of foil used for the cathodes. Furthermore, the present capacitor provides for a simplified capacitor having fewer components.

Figure 4:
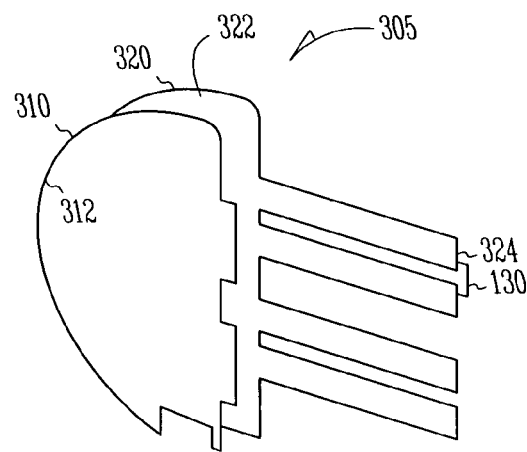
FIG. 4 is an exploded perspective view illustrating a cathode base layer as constructed in accordance with one embodiment.

FIG. 4 illustrates an exploded view of the anode stack 200 according to one embodiment. The anode stack 200 includes an anode separator 210, at least one conductive layer 220, and an edge connection member or edge clip 240 coupled with at least one of the conductive layers 220. In one option, the at least one conductive layer 220 includes a first conductive layer 222, a second conductive layer 224, and a third conductive layer 226. The first conductive layer 222 includes a clearance portion 242 surrounding the edge clip 240. Each of the conductive layers 220 include a major surface 230 and a side surface 232.

Figure 5:
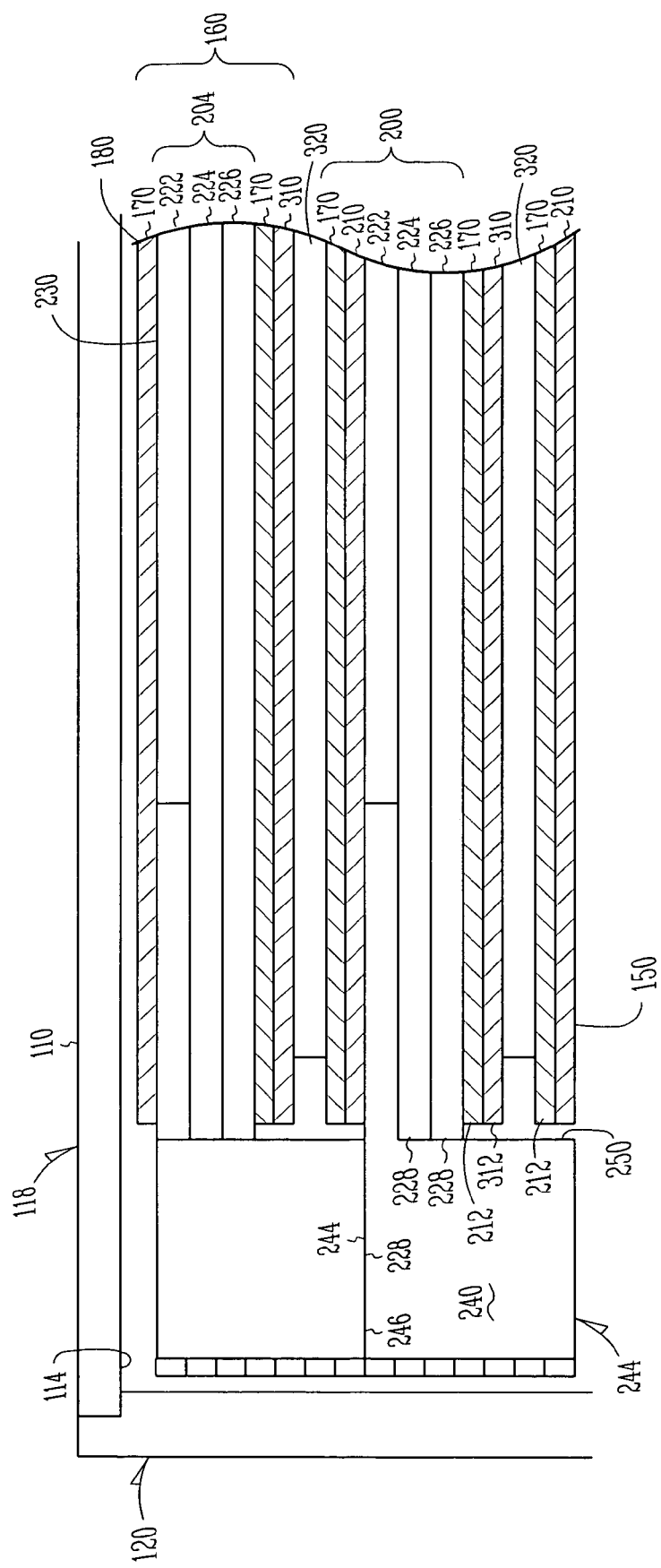
FIG. 5 is a cross-sectional view illustrating a portion of a capacitor as constructed in accordance with one embodiment.

FIG. 5 illustrates an exploded view of cathode base layer 305 according to one embodiment. Cathode base layer 305 includes legs 324, the number of which and location of which are varied depending on the cathode stack 300. Legs 324 are for interconnecting base layer 305 to the other cathodes 300 of the capacitor stack. Cathode base layer 305 includes a cathode separator 310 and a cathode conductive layer 320. In one embodiment, the cathode conductive layer 320 has an outer perimeter 322 inset from the cathode separator edges 312 so that the edge clip 240 (FIG. 4) will not contact the cathode conductive layer 320. Since the outer perimeter 322 is inset, this can help to prevent a discontinuity on an edge 228 of the anode stack 200 (FIG. 4) from making contact with the conductive layer 320 of the cathode stack 300. This design also allows for more variations in tolerances which can occur during the manufacturing of the anode stack 200 and the cathode stack 300. Attached or integral with cathode 305 is connection member 120 for attaching cathode 300 to case 110.

Figure 6:
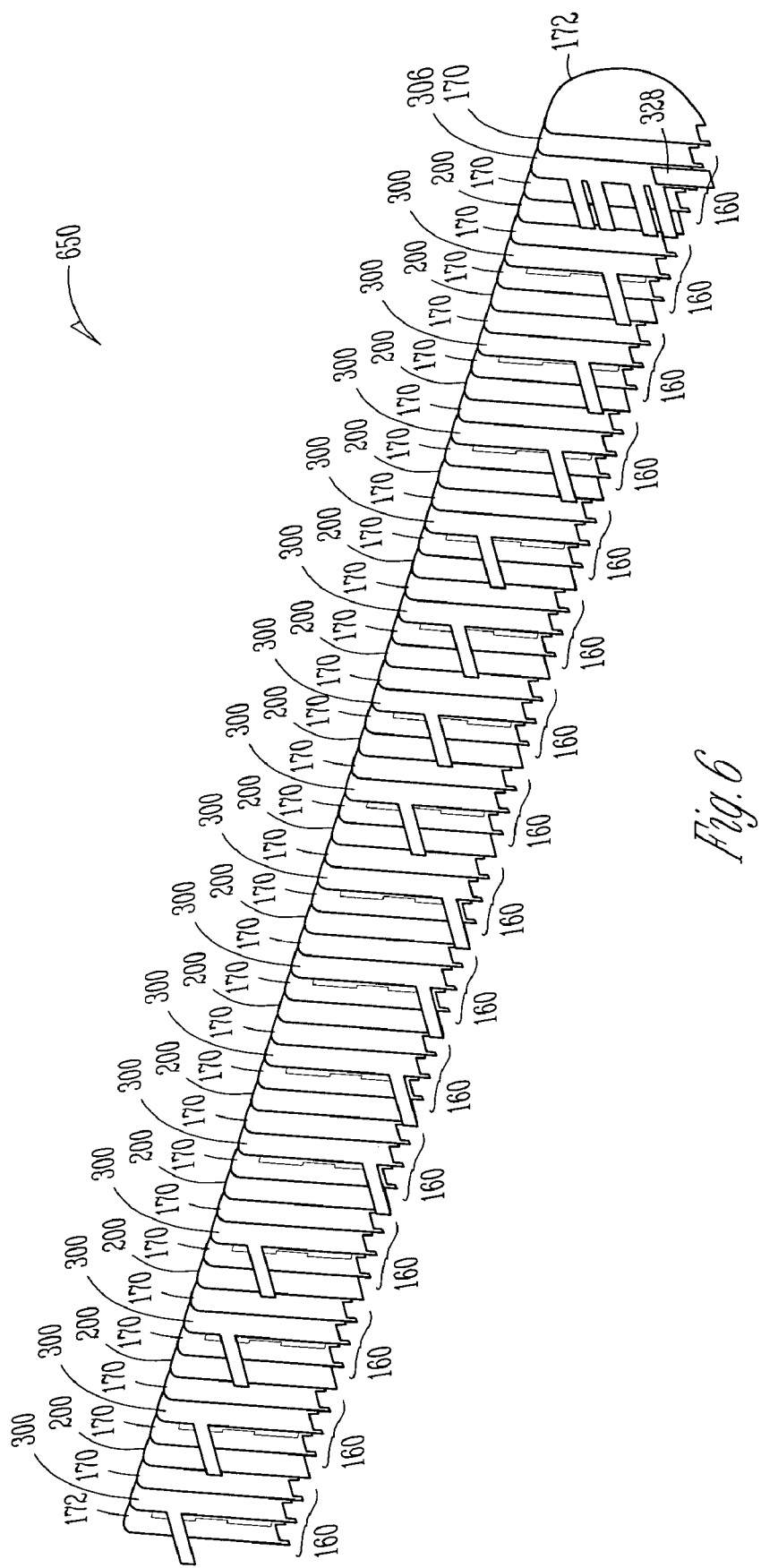
FIG. 6 is an exploded perspective view illustrating a capacitor stack as constructed in accordance with one embodiment.

FIG. 6 illustrates a cross-sectional view of the capacitor stack 150 within the case 110. Although the discussion relates to an upper portion of the case, the view of the capacitor stack is substantially the same for a lower portion of the case, and therefore is not repeated. The capacitor stack 150 includes one or more anode stacks 200, where each anode stack 200 includes, for example, a first conductive layer 222, a second conductive layer 224, and a third conductive layer 226. The anode stack 200 further includes an anode separator 210. The layers 222, 224, 226 of the anode stack 200 are coupled together. In one embodiment, the layers are staked together as described in application Ser. No. 09/706,518 entitled FLAT CAPACITOR HAVING STAKED FOILS AND EDGE-CONNECTED CONNECTION MEMBERS, filed on Nov. 3, 2000, now issued as U.S. Pat. No. 6,687,118, and incorporated herein by reference in its entirety.

The major surface 230 of the first conductive layer 222 of the first anode stack 204 faces the etched upper inner 114 surface of the case 110, separated form case 110 by separator 170. An electrolyte 180 is disposed between the major surface 230 and the upper inner surface 114. The electrolyte 180 facilitates a storage of charge between the anode stack 200 and the case 110. The etched upper inner surface 114 of the case 110 services the anode stack 200 in the same way that a cathode stack 300 services the anode stack 200. In one embodiment, the capacitor stack 150 includes a first anode stack 204 having a major surface 230 facing and adjacent the upper inner surface 114, and a second anode stack 206 (FIG. 2) having a major surface 230 confronting the lower etched inner surface 116 (FIG. 1), where the case 110 services both the first anode stack 204 and the second anode stack 206.

In one embodiment, an inner surface 250 of the edge clip 240 extends along the edges 228 of the second and third conductive layers 224, 226 of the anode stack 200. The inner surface 250 of the edge clip 240 also extends past the separator edge 212 and the cathode separator edge 312. The edge clip 240 also extends along the edge 212 of the anode separator of an adjacent capacitor element 160 until making contact and being connected with an adjacent edge clip 240. A plurality of edge clips stack on top of one another such that a bottom surface 244 of an edge clip 240 contacts a top surface 246 of an edge clip 240 of an adjacent capacitor element 160.

The edge clip 240 allows for greater design flexibility in the choice of materials for the anode conductive layers 220 as the conductive layers remain essentially flat while the connection between anode stacks 200 is made. In addition, the edge clip 240 assists in filling the cross section of the case with anodic surface area, and thus increases the overall percentage of space within the case occupied by anodic surface area. This helps to increase capacitance of the capacitor, and/or allows for the capacitor to be made smaller.

Some embodiments omit edge clips 240, and interconnect the anode stacks 200 with tabs which are attached to or integral with each anode stack.

In one embodiment, edge clips 240 are interconnected and coupled to feedthrough 280 (FIG. 1), which is insulated from case 110. In addition, the feed through opening 282 (FIG. 1) is sealed.

One example of a method for forming a capacitor having an active cathodic case is as follows. The method includes forming and aligning a capacitor stack including at least one anode stack and at least one cathode stack, etching at least a portion of an inner surface of a capacitor case, the inner surface including an upper inner surface and a lower inner surface. The method further includes disposing the capacitor stack in the capacitor case, and an at least one anode stack is adjacent the inner surface of the capacitor case. The method also includes disposing an electrolyte between the at least one anode and the inner surface of the case.

Several options for the method are as follows. For instance, in one option, the method includes etching layers of the anode stack. In another option, the method further includes confronting a major surface of a first anode stack with the upper inner surface of the case. In yet another option, the method includes confronting a major surface of a second anode stack with the lower inner surface of the case. Optionally, the method includes etching an entire inner surface of the case.

In another example of manufacturing the above described cathodic case capacitor, a capacitor case is formed, including a case cover and a case bottom, and the inner surface of the capacitor case is etched. A stack of cathode and anode layers are stacked and aligned to form a capacitor stack. The cathode ledges are welded and folded over the stack. The capacitor stack is taped, and the anode edge clips are welded. An anode feed through is welded to the edge couplers. The capacitor stack is inserted into the capacitor case, and the case cover and cathode leg extension is welded to the case bottom.

Advantageously, the etched inner surface of the case increases cathodic surface area on an existing surface. The etched inner surface allows for reduction of cathode stacks within the case by allowing at least one outer cathode stack to be removed, which in turn allows for the size of the capacitor to be reduced. Alternatively, the anodic surface area within the case can be increased and the total capacitance of the capacitor can be increased.

Active Anodic Case Embodiment

Another aspect of the present invention provides a capacitor having an active anodic case. Referring again to FIG. 1, in one embodiment, case 110 comprises a 99.99% aluminum. In another embodiment, the case comprises at least a 98% aluminum. In one embodiment, at least a portion of the inner surface 112 is etched, and in one embodiment, the entire inner surface 112 is etched.

FIG. 6 illustrates a capacitor stack 650 according to one embodiment of the present invention. Capacitor stack 650 is mountable in case 110 similarly to stack 150.

In this embodiment, capacitor stack 650 includes a plurality of capacitor elements 160, each capacitor element 160, except for the end capacitor elements, includes at least one anode stack 200, at least one separator 170, and at least one cathode stack 300. The capacitor stack 650 includes end separators 172. Each cathode stack 300 is interconnected with the other cathode stacks in the capacitor stack 650. Each anode stack 200 is interconnected with the other anode stacks in the capacitor stack 650.

The at least one separator 170 and the end separator 172 include, but are not limited to, a paper separator. The separators are, in one option, made from a roll or sheet of separator material. Suitable materials for the separator material include, but are not limited to, pure cellulose or Kraft paper. Other chemically inert materials are suitable as well, such as porous polymeric materials. The separators layers can be cut slightly larger than the anode layers (or cathode layers) to accommodate misalignment during the stacking of layers and to prevent subsequent shorting between electrodes of opposite polarity.

Figure 3:
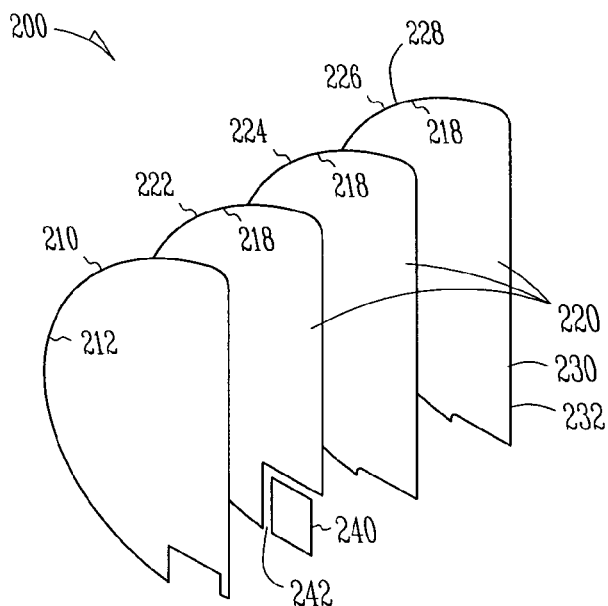
FIG. 3 is an exploded perspective view illustrating an anode stack as constructed in accordance with one embodiment.

Referring again to FIG. 3, in one embodiment, anodes 200 includes one or more conductive layers 220. Each of the conductive layers 220 include an outer edge surface 218, which define an outer edge of the capacitor stack 650 (FIG. 6). In one option, the outer edge surface 218 of at least one of the conductive layers 220 is exposed and is electrically coupled with the inner surface 112 of the case 110 (FIG. 1), as will be discussed further below.

Figure 7:
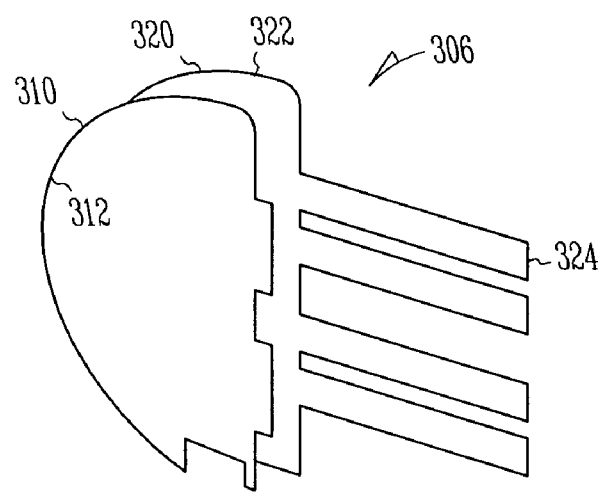
FIG. 7 is an exploded perspective view illustrating a cathode stack as constructed in accordance with another embodiment.

FIG. 7 illustrates an exploded view of a cathode stack 306 in greater detail. The cathode stack includes legs 324, the number of which and location of which is varied depending on the cathode stack 300. The cathode stack 300 includes a cathode separator 310 and a cathode conductive layer 320. The cathode conductive layer 320 has an outer perimeter 322 inset from the cathode separator edges 312 so that the edge clip 240 (FIG. 3) will not contact the cathode conductive layer 320. Since the outer perimeter 322 is inset, this can help to prevent a discontinuity on an edge 228 of the anode stack 200 (FIG. 3) from making contact with the conductive layer 320 of the cathode stack 300. This design also allows for more variations in tolerances which can occur during the manufacturing of the anode stack 200 and the cathode stack 300.

Figure 9:
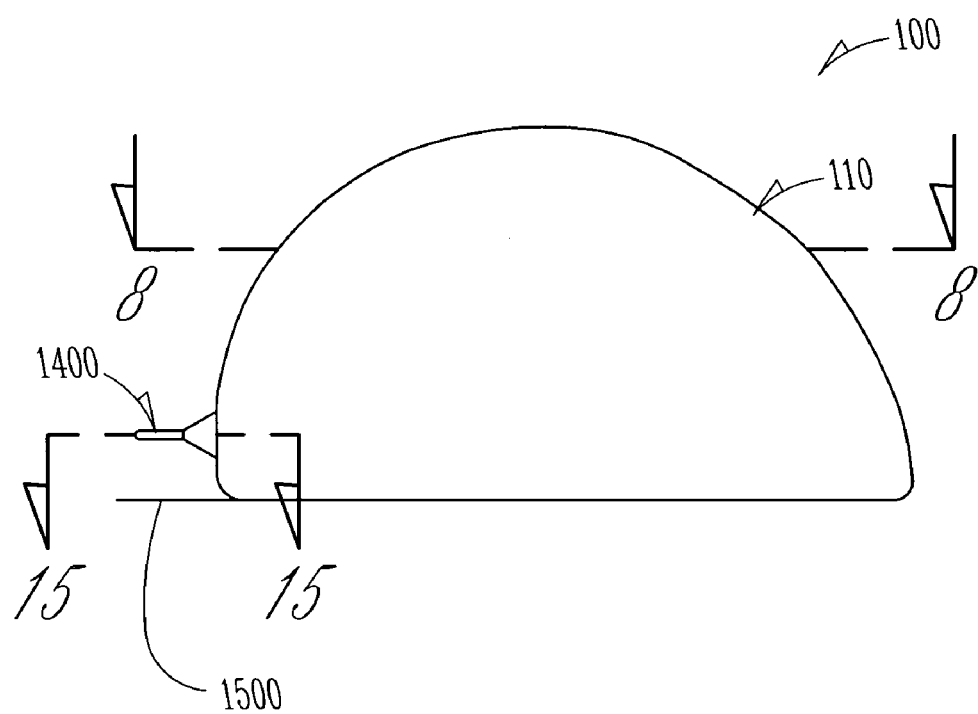
FIG. 9 is a top plan view illustrating a capacitor as constructed in accordance with another embodiment.
Figure 8:
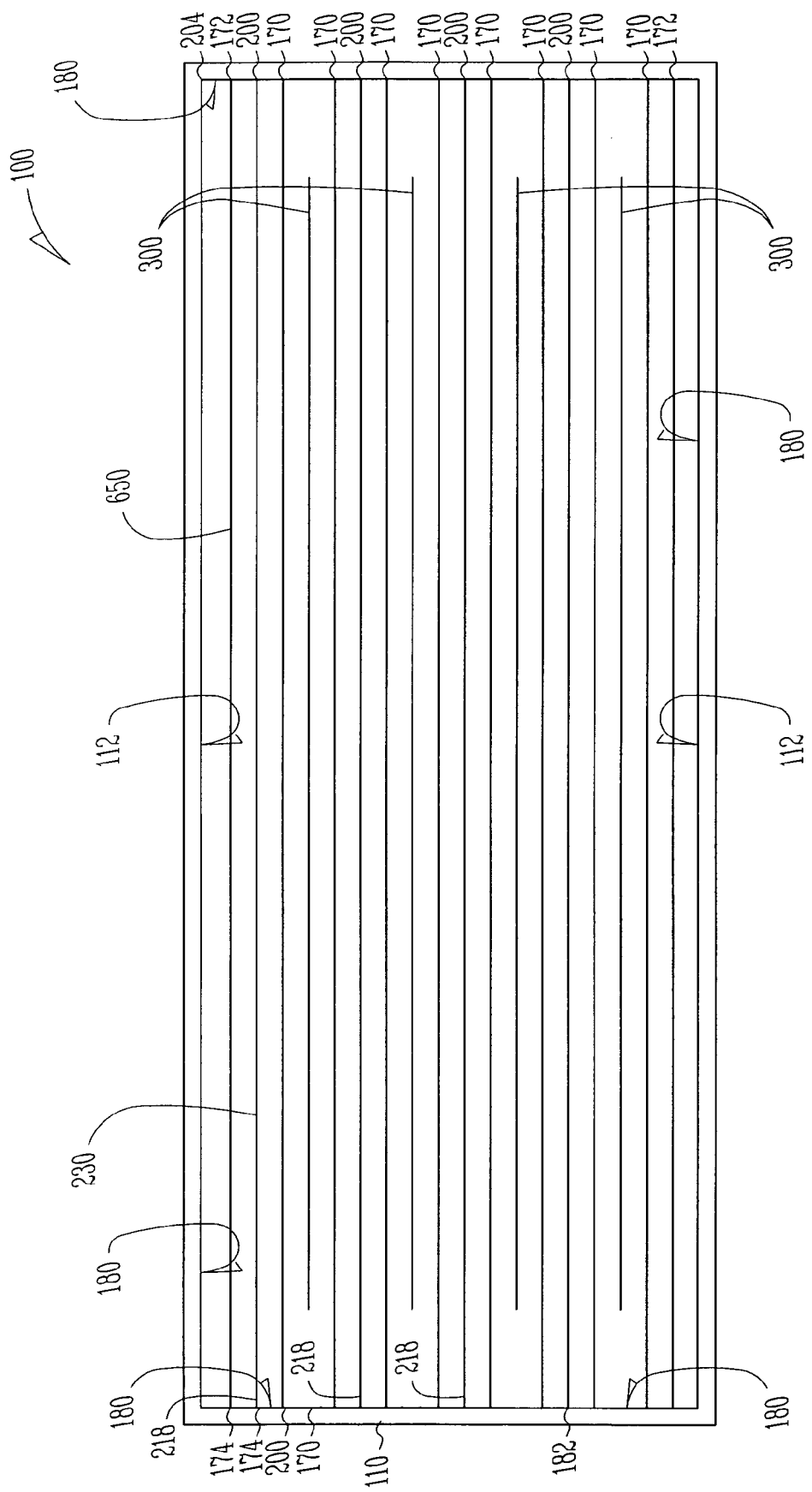
FIG. 8 is a cross-sectional view taken along 8—8 of FIG. 9 illustrating a portion of a capacitor as constructed in accordance with one embodiment.

FIG. 8 illustrates a cross-sectional view taken along 8—8 of FIG. 9, which shows a capacitor 100. The capacitor stack 650 is disposed within the capacitor case 110. The inner surface 112 of the capacitor case 110 includes a dielectric 180 formed thereon. In this embodiment, the perimeter 174 of each separator 170 and 172 contacts the inner surface 112 of the case 110. In addition, the outer perimeter 322 (FIG. 7) of the cathode stack 300 is inset from the perimeter 174 of the separator 170. In one embodiment, the major surface 230 of the first anode stack 204 faces the etched upper inner 112 surface of the case 110.

Outer edge surface 218 of at least one anode stack 200 contacts the inner surface 112 of the case 110. In one option, the outer edge surface 218 is exposed and electrically coupled with the inner surface 112 of the case 110, for example, by intimate contact. In another option, the anode stack 200 is coupled with the inner surface 112 of the case 110 in other manners. For example, the anode stack 200 is coupled at 182 with the inner surface 112 by welding the anode stack 200 with the inner surface 112. In another example, the anode stack 200 is coupled at 182 with the inner surface 112 by bonding the anode stack 200 with the inner surface 112, for example, using epoxy or other bonding materials.

Figure 10:
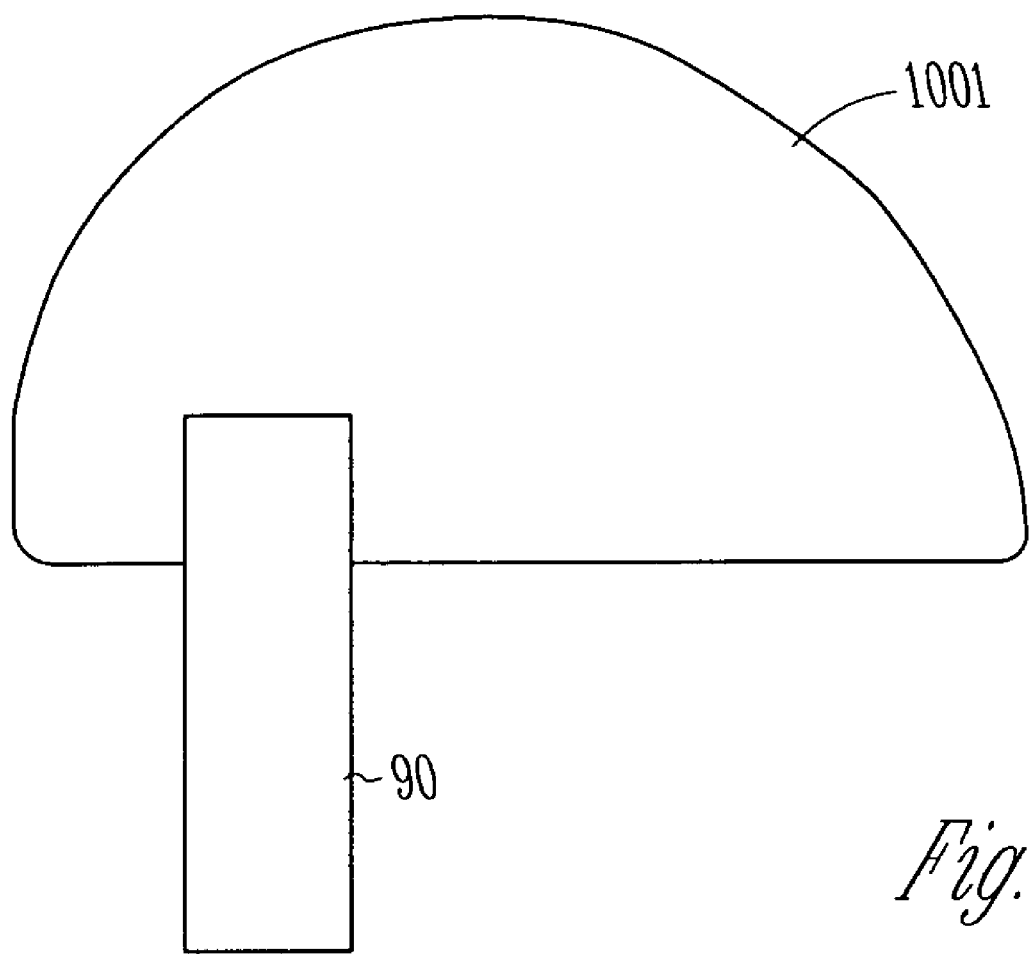
FIG. 10 is a top plan view illustrating an anode as constructed in accordance with one embodiment.

FIG. 10 shows an anode 1001 having a tab connector 90 according to another embodiment. In this embodiment, one anode in capacitor stack 650 includes a tab connector 90. The other anodes in the capacitor stack are interconnected and tab connector 90 is coupled to case 110. In some embodiments, more than one anodes have tab connectors 90. In one embodiment, tab connector is welded to anode 1001.

Figure 11:
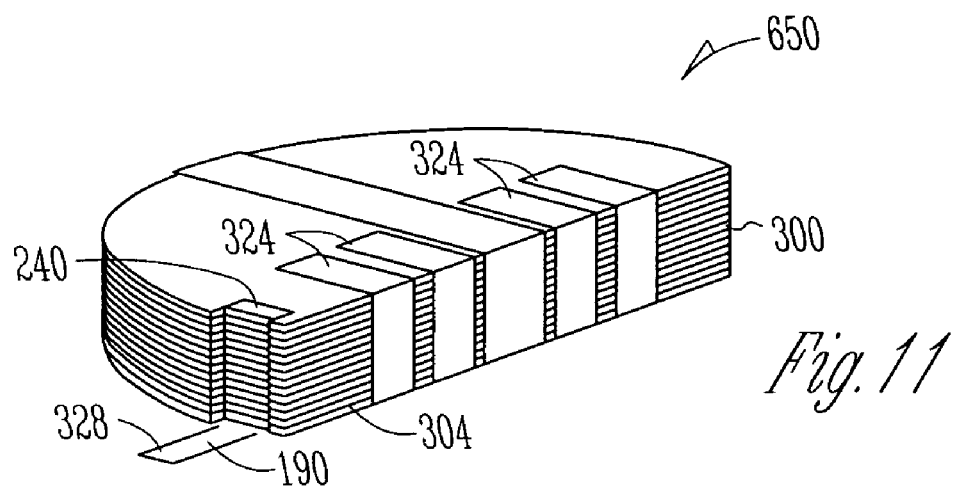
FIG. 11 is a perspective view illustrating a capacitor stack as constructed in accordance with one embodiment.

FIG. 11 illustrates a capacitor stack 650 including a cathode extension leg 328. In this embodiment, the cathode extension leg 328 extends from the bottom cathode stack 304 below the bottom edge clip 240. The cathode extension leg 328 is insulated from the edge clip 240 by an insulator 190 included on the inner surface of the cathode extension leg 328. The cathode extension leg 328 is folded over the edge clips 240 and coupled to a feedthrough 380 (FIG. 1). After connection to the feedthrough 380, the exposed portion of the cathode extension leg optionally is insulated to prevent contact with the anodic case 110. The cathode stacks 300 include cathode interconnect legs 324. In an alternative option, a feedthrough 380 (FIG. 1) is coupled to one of the legs 324 and the remaining exposed portion is covered by insulator 192 (FIG. 12).

Figure 12:
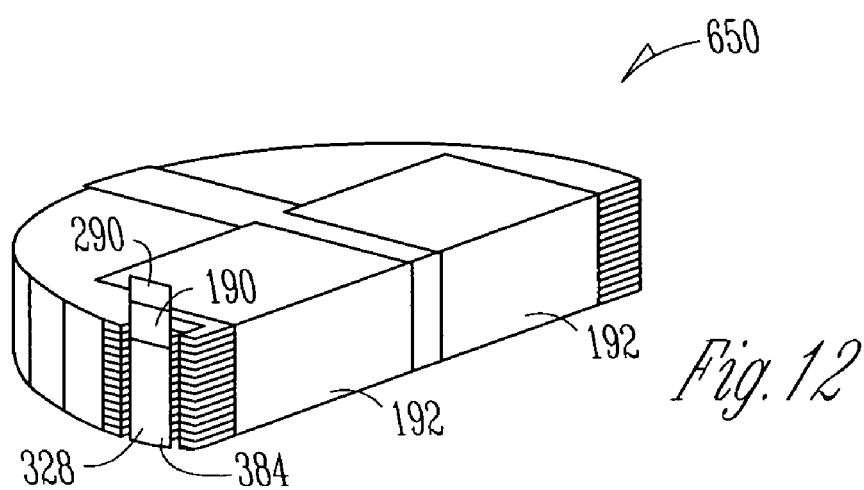
FIG. 12 is a perspective view illustrating a capacitor stack as constructed in accordance with one embodiment.
Figure 13:
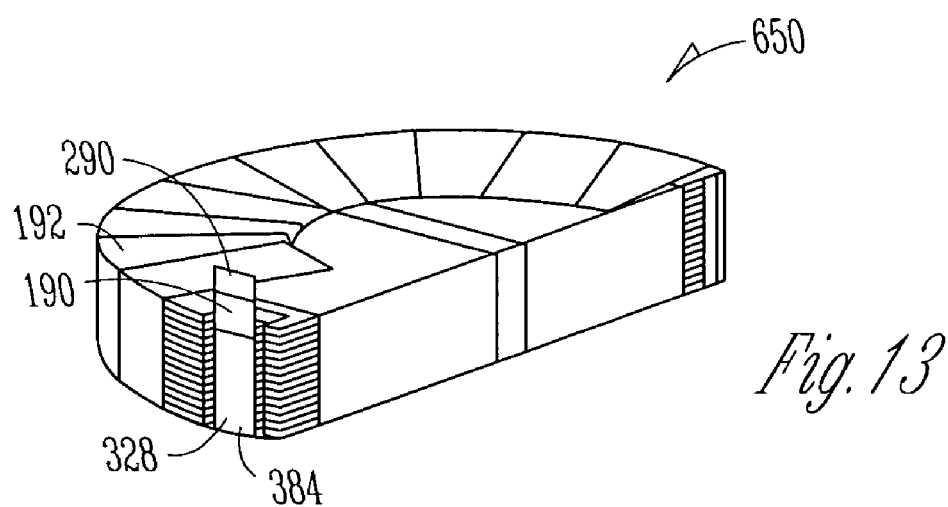
FIG. 13 is a perspective view illustrating a capacitor stack as constructed in accordance with one embodiment.

FIGS. 12 and 13 illustrate the capacitor stack 650 where the anode stack 200 (FIG. 6) is coupled with the case 110 (FIG. 1). The capacitor stack 650 includes an anode extension leg 290 coupled to the outer contact surface of the edge clips 240. The cathode extension leg 328 is folded over the anode extension leg 290 and is insulated from the anode extension leg 290 by insulator 190. The outer surface of the cathode extension leg 328 is suitable for receiving a feedthrough connection. After connection to a feedthrough, the exposed portion of the cathode extension leg 328 is insulated to prevent contact with the anodic case 110. The capacitor stack 650 includes insulator 192 over cathode interconnect legs 324.

Figure 14:
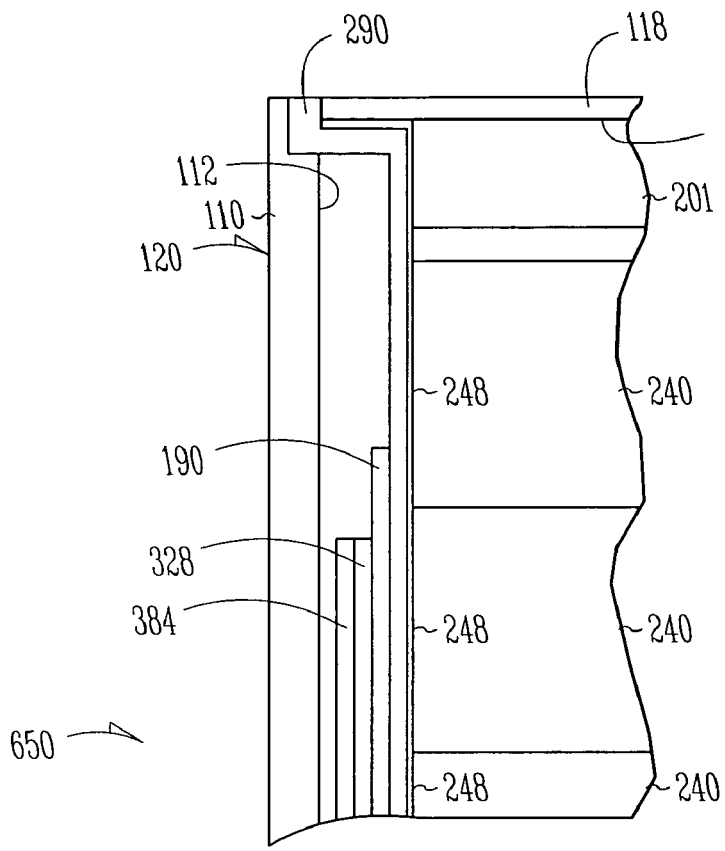
FIG. 14 is a cross-sectional view illustrating a portion of a capacitor as constructed in accordance with one embodiment.

FIG. 14 illustrates a cross-sectional view of a portion of the capacitor stack 650. In this embodiment, the connection between the edge clips 240 and the case 110 is with the anode extension leg 290. The anode extension leg 290 is coupled to and extends from the interconnected edge clips 240. Each edge clip 240 includes an outer contact surface 248, which provides a larger contact surface that is more easily attached to an anode extension leg 290 than existing methods of attachment. The anode extension leg 290, in one option, is sufficiently ductile to be deformed to extend along the side of the capacitor stack 150 and between the interface between the case cover 110 and the case bottom 120. As mentioned above, the cathode extension leg 328 folds over the anode extension leg 290 and is insulated from the anode stacks (FIG. 6) and anode extension leg 290 by insulator 190.

Figure 15:
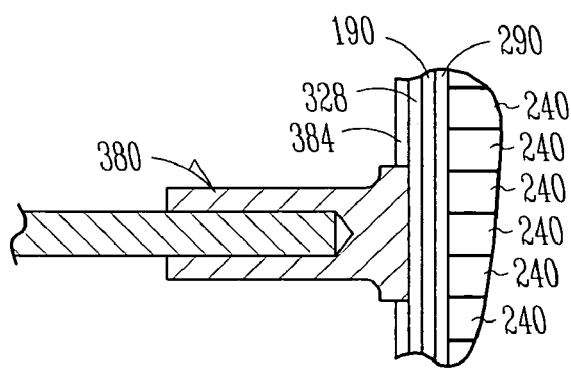
FIG. 15 is a cross-sectional view taken along 15—15 of FIG. 9 illustrating a portion of a capacitor as constructed in accordance with one embodiment.

FIG. 15 shows a cross-section of section 15—15 of FIG. 9. The outer surface of the cathode extension leg 328 is coupled to a cathode feedthrough 380. An insulator 384 is included over the remaining exposed portion of the outer surface of the cathode extension leg 328. The cathode feedthrough 380 is welded to the outer surface of the cathode extension leg 328, and the cathode feedthrough 380 is insulated from the case 110 (FIG. 1). The feedthrough opening 382 (FIG. 1) is sealed.

One aspect of the present invention provides a method of manufacturing. In one embodiment, a method includes stacking at least one anode stack including one or more conductive anode layers and an anode separator, stacking at least one cathode stack including one or more conductive cathode layers and a cathode separator, aligning and stacking the at least one anode stack and the at least one cathode stack to form a capacitor stack, disposing the capacitor stack within a capacitor case, and electrically coupling the anode stack with the capacitor case.

Several options for the method are as follows. For example, in one option, the method further includes etching an inner surface of the capacitor case, and/or etching the one or more conductive anode layers. In another option, the method further includes welding the anode stack with the capacitor case, or bonding the anode stack with the capacitor case. In a further option, the method further includes coupling a cathode feedthrough with the cathode stack, and disposing the cathode feedthrough through an opening of the capacitor case. In another option, the method further includes stacking the conductive cathode layer in an offset position from the anode conductive layer, and/or exposing outer edges of the one or more conductive anode layers. In yet another option, the method further includes coupling the exposed outer edges with the capacitor case, and/or welding the exposed outer edges with the capacitor case.

In another example of manufacturing the above described capacitor, a capacitor case is formed, including a case cover and a case bottom, and optionally the inner surface of the capacitor case is etched. A stack of cathode and anode layers are stacked and aligned to form a capacitor stack. The cathode legs are welded and folded over the stack. The capacitor stack is taped, and the anode edge clips are welded. An anode leg is welded to the edge clips, and the cathode feedthrough is welded to the cathode extension leg. The capacitor stack is inserted into the capacitor case, and the case cover and the anode extension leg are welded to the case bottom. An anode ribbon is welded to the case, and the opening for the feedthrough is sealed.

Advantageously, having the case contribute to the effective anodic surface area increases the capacitance of the capacitor without increasing the outer packaging dimensions. Alternatively, it allows for achievement of a given total capacitance with a smaller package. A further benefit is that since the edge of the cathode stack is offset from the anode stack, damage or puncturing of the separator layer is minimized.

Implantable Medical Device

Figure 16:
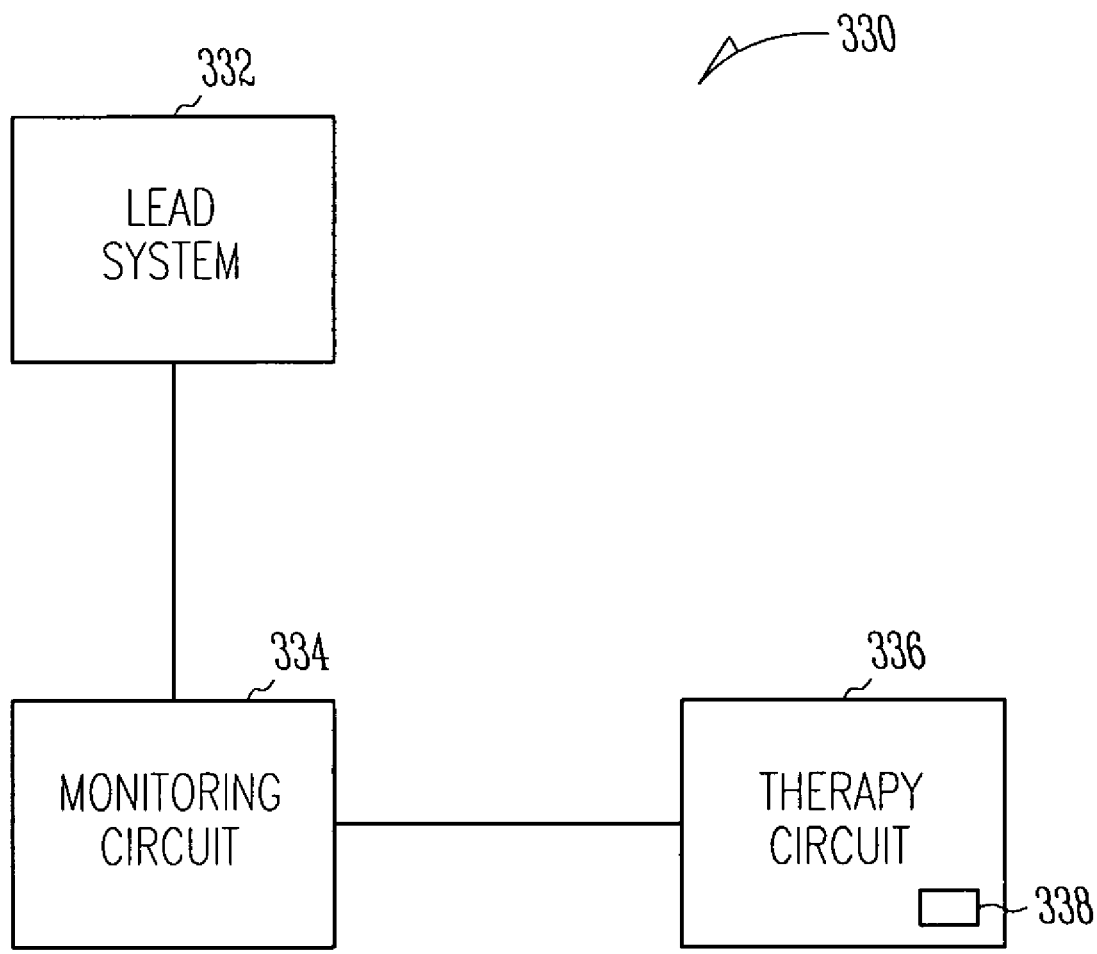
FIG. 16 is a block diagram of an implantable heart monitor system constructed in accordance with one embodiment.

FIG. 16 illustrates one of the many applications for the capacitor assembly. For example, one application includes an implantable heart monitor 330 which provides therapeutic stimulus to a heart muscle, for instance, a defibrillator. The heart monitor 330 is coupled with a lead system 332. The lead system 332 is implanted in a patient and electrically contacts strategic portions of a patient's heart. The heart monitor 330 further includes a monitoring circuit 334 for monitoring heart activity through one or more of the leads of the lead system 332. The heart monitor 330 further includes a therapy circuit 336 which includes one or more capacitors 338 having one or more of the features discussed above. The therapy circuit 336 delivers a pulse of energy through one or more of the leads of lead system 332 to the heart, where the heart monitor 330 operates according to well known and understood principles.

In addition to implantable defibrillators, the capacitor can be incorporated into other cardiac rhythm management systems, such as heart pacers, combination pacer-defibrillators, congestive heart failure devices, and drug-delivery devices for diagnosing or treating cardiac arrhythmias. Alternatively, the capacitor can be incorporated also into non-medical applications, for example, photographic flash equipment.

It is to be understood that the above description is intended to be illustrative, and not restrictive. Many other embodiments will be apparent to those of skill in the art upon reading and understanding the above description. It should be noted that embodiments discussed in different portions of the description or referred to in different drawings can be combined to form additional embodiments of the present invention. The scope of the invention should, therefore, be determined with reference to the appended claims, along with the full scope of equivalents to which such claims are entitled.

What is claimed is:

1. An assembly comprising:
at least one lead adapted to apply electrical energy to patient;
a monitoring circuit adapted to monitor electrical function of a heart;
a therapy circuit adapted to deliver electrical energy through the at least one lead, wherein the therapy circuit includes one or more capacitors, each including:
a case having an inner surface including an upper inner surface and a lower inner surface;

a capacitor stack disposed within the case, the capacitor stack including a plurality of cathode stacks and a plurality of anode stacks; and the plurality of anode stacks including a first anode stack disposed adjacent to the upper inner surface, the first anode stack including at least one conductive layer having a major surface, the major surface confronting the upper inner surface of the case; and a separator between the upper inner surface and the major surface.

2. The assembly as recited in claim 1, the plurality of anode stacks including a second anode stack disposed adjacent to the lower inner surface, the second anode stack including at least one conductive layer having a major surface, the major surface confronting the lower inner surface of the case.

3. The assembly as recited in claim 1, wherein the plurality of anode stacks comprise etched anode stacks.

4. The assembly as recited in claim 1, wherein the case comprises at least 98% aluminum.

5. The assembly of claim 1, wherein the case is at least partially etched and is adapted to be an active cathodic element servicing one or more anodes of the capacitor stack.

6. An assembly comprising:
at least one lead adapted to apply electrical energy to patient;
a monitoring circuit adapted to monitor an electrical function of a heart of the patient;
a therapy circuit adapted to deliver electrical energy through the at least one lead, wherein the therapy circuit includes one or more capacitors, each capacitor including:
an aluminum case; and
a capacitor stack mounted within the aluminum case, the capacitor stack including one or more anodes and one or more cathodes, one of the one or more anodes and one or more anodes attached to the aluminum case, wherein the case is adapted be an active anode or cathode layer to functionally service the capacitor stack.

7. The assembly of claim 6, wherein the case is etched and is adapted to be an active cathodic element servicing one or more anodes of the capacitor stack which are adjacent the case.

8. The assembly of claim 6, wherein the case is adapted to be an active anodic element.

9. An assembly comprising:
at least one lead adapted to apply electrical energy to patient;
a monitoring circuit adapted to monitor an electrical function of a heart of the patient;
a therapy circuit adapted to deliver electrical energy through the at least one lead, wherein the therapy circuit includes one or more capacitors, each capacitor including:
at least one anode stack including one or more anode conductive layers and an anode separator;
at least one cathode stack including one or more cathode conductive layers and a cathode separator;
at least one separator disposed between the anode stack and the cathode stack, each at least one anode stack stacked with the cathode stack to form a capacitor stack; and a capacitor case sized to receive therein the capacitor stack, the capacitor case including a conductive surface, and one or more of the anode conductive layers electrically coupled with the conductive surface of the capacitor case.

10. The assembly of claim 9, wherein the capacitor case comprises an etched capacitor case.

11. The assembly of claim 9, wherein one or more of the anode conductor layers includes an exposed edge coupled with the capacitor case.

12. The assembly of claim 9, wherein the one or more anode conductive layers is coupled to the capacitor case by an elongated tab.

13. The assembly of claim 9, wherein the case comprises at least 98% aluminum.

14. The assembly of claim 9, wherein the capacitor case comprises an etched capacitor case of at least 99.99% aluminum.

15. An assembly comprising:
at least one lead adapted to apply electrical energy to patient;
a monitoring circuit adapted to monitor an electrical function of a heart of the patient;
a therapy circuit adapted to deliver electrical energy through the at least one lead, wherein the therapy circuit includes one or more capacitors, each capacitor including:
at least one anode stack including one or more anode conductive layers and an anode separator, the one or more conductive layers including an exposed outer anode edge;
at least one cathode stack including one or more cathode conductive layers and a cathode separator;
at least one separator disposed between the anode stack and the cathode stack, each at least one anode stack stacked with the cathode stack to form a capacitor stack;
an etched capacitor case sized to receive therein the capacitor stack, the capacitor case including a conductive surface, and the exposed outer anode edge electrically coupled with the conductive surface of the capacitor case;
a cathode feedthrough coupled with at least one cathode stack, the cathode feedthrough extending through and is insulated from an opening of the case; and
each of the cathode conductive layers is defined in part by a cathode edge surface, and each of the anode conductive layers is defined in part by an anode edge surface, and the cathode edge surface is offset from the anode edge surface.

16. The assembly of claim 15, wherein the case comprises at least 98% aluminum.

17. The assembly of claim 15, wherein the capacitor case comprises at least 99.99% aluminum.

* * * * *

UNITED STATES PATENT AND TRADEMARK OFFICE
CERTIFICATE OF CORRECTION

PATENT NO. : 7,154,739 B2  Page 1 of 1
APPLICATION NO. : 10/969441
DATED : December 26, 2006
INVENTOR(S) : O'Phelan It is certified that error appears in the above-identified patent and that said Letters Patent is hereby corrected as shown below:

In column 11, line 38, in Claim 6, after "adapted" insert -- to --.

Signed and Sealed this

Tenth Day of April, 2007

JON W. DUDAS
*Director of the United States Patent and Trademark Office*